US007835265B2

(12) United States Patent
Wang et al.

(10) Patent No.: US 7,835,265 B2
(45) Date of Patent: Nov. 16, 2010

(54) HIGH AVAILABILITY ETHERNET BACKPLANE ARCHITECTURE

(75) Inventors: Linghsiao Wang, Irvine, CA (US); Rong-Feng Chang, Irvine, CA (US); Eric (Changhwa) Lin, Irvine, CA (US); James Ching-Shau Yik, Mission Viejo, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1601 days.

(21) Appl. No.: 10/284,856

(22) Filed: Oct. 31, 2002

(65) Prior Publication Data
US 2004/0085893 A1 May 6, 2004

(51) Int. Cl.
G06F 11/00 (2006.01)
H04L 12/28 (2006.01)

(52) U.S. Cl. .................. 370/216; 370/245; 370/248; 370/338; 370/392; 370/395.2; 709/223; 709/231; 709/238; 709/242

(58) Field of Classification Search ......... 370/216–223, 370/242–248, 389, 338, 392, 385, 392.2; 714/56, 4, 6; 709/231, 223, 238, 242
See application file for complete search history.

(56) References Cited

U.S. PATENT DOCUMENTS

| | | | | |
|---|---|---|---|---|
| 4,980,906 A | * | 12/1990 | Forson et al. | 379/32.04 |
| 5,022,070 A | * | 6/1991 | Forson et al. | 379/32.01 |
| 5,649,100 A | * | 7/1997 | Ertel et al. | 709/225 |
| 5,848,128 A | * | 12/1998 | Frey | 379/9 |
| 6,032,194 A | | 2/2000 | Gai et al. | |
| 6,052,733 A | | 4/2000 | Mahalingam et al. | |
| 6,088,328 A | * | 7/2000 | McKnight | 370/216 |
| 6,104,696 A | | 8/2000 | Kadambi et al. | |

(Continued)

FOREIGN PATENT DOCUMENTS

EP 1416671 A2 * 5/2004

(Continued)

OTHER PUBLICATIONS

Information Technology-Telecommunications and Information Exchange between Systems-Local and Metropolitan area Networks-Specific Requirements, ISO/IEC 8802-3, IEEE, 2000, pp. 698-744 and 1215-1278.

(Continued)

Primary Examiner—Ayaz R Sheikh
Assistant Examiner—Venkatesh Haliyur
(74) Attorney, Agent, or Firm—Thomas, Kayden, Horstemeyer & Risley, LLP

(57) ABSTRACT

A high availability backplane architecture. The backplane system includes redundant node boards operatively communicating with redundant switch fabric boards. Uplink ports of the node boards are logically grouped into trunk ports at one end of the communication link with the switch fabric boards. The node boards and the switch fabric boards routinely perform link integrity checks when operating in a normal mode such that each can independently initiate failover to working ports when a link failure is detected. Link failure is detected either by sending a link heartbeat message after the link has had no traffic for a predetermined interval, or after receiving a predetermined consecutive number of invalid packets. Once the link failure is resolved, operation resumes in normal mode.

11 Claims, 7 Drawing Sheets

U.S. PATENT DOCUMENTS

| | | | |
|---|---|---|---|
| 6,105,151 A | 8/2000 | Mahalingam et al. | |
| 6,128,277 A | 10/2000 | Bruck et al. | |
| 6,134,678 A | 10/2000 | Mahalingam et al. | |
| 6,208,616 B1 | 3/2001 | Mahalingam et al. | |
| 6,236,654 B1* | 5/2001 | Egbert | 370/392 |
| 6,246,666 B1 | 6/2001 | Purcell et al. | |
| 6,262,977 B1 | 7/2001 | Seaman et al. | |
| 6,285,656 B1* | 9/2001 | Chaganty et al. | 370/228 |
| 6,308,282 B1* | 10/2001 | Huang et al. | 714/4 |
| 6,330,605 B1* | 12/2001 | Christensen et al. | 709/226 |
| 6,366,557 B1 | 4/2002 | Hunter | |
| 6,381,218 B1* | 4/2002 | McIntyre et al. | 370/245 |
| 6,389,551 B1* | 5/2002 | Yount | 714/4 |
| 6,393,485 B1* | 5/2002 | Chao et al. | 709/231 |
| 6,556,953 B2* | 4/2003 | Lay et al. | 702/183 |
| 6,601,187 B1* | 7/2003 | Sicola et al. | 714/6 |
| 6,636,922 B1* | 10/2003 | Bastiani et al. | 710/305 |
| 6,643,602 B2* | 11/2003 | Lay et al. | 702/117 |
| 6,643,795 B1* | 11/2003 | Sicola et al. | 714/6 |
| 6,675,243 B1* | 1/2004 | Bastiani et al. | 710/105 |
| 6,678,369 B2* | 1/2004 | DeMent et al. | 379/221.03 |
| 6,721,806 B2* | 4/2004 | Boyd et al. | 719/312 |
| 6,917,986 B2* | 7/2005 | Mor et al. | 709/238 |
| 7,020,076 B1* | 3/2006 | Alkalai et al. | 370/217 |
| 7,028,122 B2* | 4/2006 | Williams | 710/260 |
| 7,085,225 B2* | 8/2006 | Schaller et al. | 370/217 |
| 7,209,453 B1* | 4/2007 | Yun et al. | 370/242 |
| 7,212,534 B2* | 5/2007 | Kadambi et | 370/395.2 |
| 7,260,066 B2* | 8/2007 | Wang et al. | 370/248 |
| 7,284,067 B2* | 10/2007 | Leigh | 709/238 |
| 2003/0105850 A1* | 6/2003 | Lean et al. | 709/223 |
| 2003/0235168 A1* | 12/2003 | Sharma et al. | 370/338 |
| 2004/0001485 A1* | 1/2004 | Frick et al. | 370/389 |
| 2004/0034871 A1* | 2/2004 | Lu et al. | 725/111 |
| 2004/0085894 A1* | 5/2004 | Wang et al. | 370/216 |

FOREIGN PATENT DOCUMENTS

| | | |
|---|---|---|
| FR | 2849731 A1 * | 7/2004 |
| WO | WO-00/79711 A1 | 12/2000 |

OTHER PUBLICATIONS

"Configuring UDLD", CISCO, Oct. 2, 2002, XP002347127.
Search Report of Counterpart EP application No. 1416671 A3, dated Jul. 8, 2006.

* cited by examiner

| DESTINATION MAC ADDRESS (6) | SOURCE MAC ADDRESS (6) | ETHERTYPE (2) | OPCODE (2) | PAD (44) | CRC (4) |

FIG. 7

HIGH AVAILABILITY ETHERNET BACKPLANE ARCHITECTURE

BACKGROUND OF THE INVENTION

This invention is related to the field of networking devices, and more particularly to an Ethernet network device having backplane architecture for detecting a link failure and switching to a good port in response thereto.

BACKGROUND

Any business operating on a 24/7 basis strives cannot afford to suffer from outages for longer than just a couple of minutes or perhaps no more than half an hour. Unplanned outages can severely hamper data operations and, can be extremely expensive in terms of lost revenue and manpower expended to correct such situations. Two recent 1995 studies showed that average businesses lost between $80,000 and $350,000 per hour due to unplanned outages. With these dollar loses in mind, it becomes quickly obvious that setting up a redundant information technology structure comes at a cheaper price than the risk of even a short outage. This is especially true when considering the relatively low prices of computers running versus the cost of such downtime. Furthermore, administrators know exactly how expensive the additional equipment, software and operator education is, whereas the cost of unplanned outages can be very difficult to quantify beforehand.

The Ethernet network has been overwhelming deployed in Local Area Networks (LAN) because of its low cost, easy deployment and installation. After years of improvements on the Ethernet technology, today, the application of Ethernet has been extended from LAN to the both WAN/MAN. More recently, the Ethernet technology is also incorporated into the backplane of chassis-based systems due to the low cost, widely available sources, and embedded error detection capability.

In the chassis-based system, the backplane is required to provide the reliable and robust connections among link cards and modules. However, since the Ethernet network was originally developed in a LAN environment, the "availability" requirement for the LAN application is quite different from the one for the backplane application. For example, in a conventional LAN environment, the spanning tree protocol is used to provide a "failover" function by reconfiguring the active topology when the network detects a link or port failure. However, the convergence time is relative long. From the time of detection of the failure, it can take as long as twenty to fifty seconds to complete the change in topology and resume to normal operation. Even using a conventional "improvement" protocol, the fast spanning tree could take fifty msec (milliseconds) to resume normal operation after detecting the failure in a switch or a link.

According to the Institute of Electrical and Electronics Engineers 802.3 standard, link aggregation has been developed to increase bandwidth and availability by aggregating more than one link together to form a link aggregation group. The media access control layer (MAC) can treat the multiple links as a single logical link. When a link in the aggregating group fails, the traffic can be distributed (or rerouted) over the remanding operating links. However, link aggregation only provides failover among parallel connections, which parallel connections are shared with the same end nodes.

For the backplane application, the Ethernet network usually has very simple configuration, e.g., a star topology, meaning that from every card slot there connects a first bus to a first switch fabric and a second bus to a second switch fabric. If the first bus fails to work, the device switches automatically to use the second bus. However, the convergence time of twenty to fifty seconds in a spanning tree recovery is not acceptable in a backplane environment. Additionally, link aggregation, as indicated hereinabove, only provides failover among parallel connections that are shared by the same end nodes. That is, a backup link is not shared with the same ends of failure link. Thus, link aggregation may not find application to the Ethernet backplane environment.

Therefore, what is needed is a simple, rapid, and robust solution to achieve high availability for the Ethernet backplane environment with link failure detection and failover switching.

SUMMARY OF THE INVENTION

The present invention disclosed and claimed herein, in one aspect thereof, comprises a high availability backplane architecture. The backplane system includes redundant node boards operatively communicating with redundant switch fabric boards. Uplink ports of the node boards are logically grouped into trunk ports at one end of the communication link with the switch fabric boards. The node boards and the switch fabric boards routinely perform link integrity checks when operating in a normal mode such that each can independently initiate failover to working ports when a link failure is detected. Once the link failure is resolved, operation resumes in normal mode.

BRIEF DESCRIPTION OF THE DRAWINGS

For a more complete understanding of the present invention and the advantages thereof, reference is now made to the following description taken in conjunction with the accompanying drawings, in which:

FIG. 7 illustrates a format of the heartbeat signal according to one embodiment of the invention.

DETAILED DESCRIPTION OF THE INVENTION

The disclosed architecture provides a high availability Ethernet backplane by automatically detecting a link failure and performing "failover" to a backup link. Failover is defined to be the process or mechanism for switching "off" a failed redundant component and switching "on" the working backup component. One aspect of the invention facilitates rapid and simple failover. Additionally, control message exchanges between nodes are minimized to reduce the processing load on the CPU (Central Processing Unit).

Two link failure detection schemes are disclosed. The fist scheme includes sending "heart beat" messages at the MAC (media access control) module; and the second includes using a frame error rate. Either one or both of the detection schemes can be implemented to detect link failures. Once a link failure is detected, the CPU is utilized to perform the failover procedure.

When the logic circuits of a node board have detected a failed port, traffic of that node board is failovered (or redirected) to the working ports (assuming that all nodes have at least two ports and each port connects to a switch fabric node). On the switch fabric node, there is a switchover link to connect two switch fabric nodes. When the switch fabric node detects a failed port, the traffic destined to the failed port is switched over to the switchover (or backup) port. Then, the other switch fabric node forwards the failover traffic to its destination device.

Figure 1:
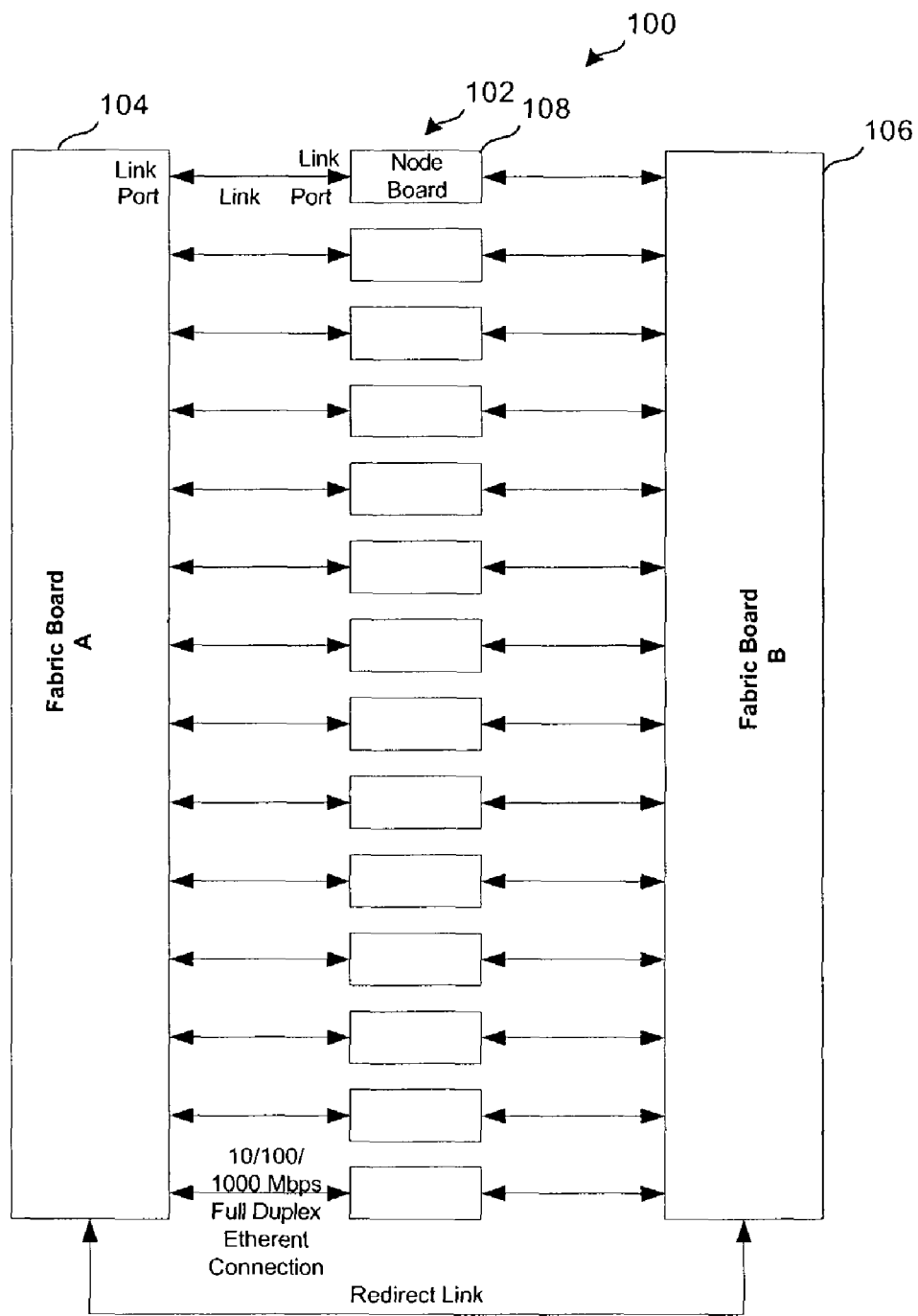
FIG. 1 illustrates a general block diagram of the topology of a dual fabric packet switching backplane.

Referring now to FIG. 1, there is illustrated a general block diagram of the topology of a dual fabric packet switching backplane (PSB) 100. The backplane 100 is used to connect multiple link cards or modules together in the chassis-based system. A typical topology of the backplane 100 is a star topology. Since reliability and availability are the critical design requirements for backplane systems, dual links are usually deployed in a high availability system. For example, the CompactPCI® Packet Switching Backplane specification (also denoted as the PICMG®2.16 specification), hereby incorporated by reference, defines a packet switching backplane standard of up to twenty-four node boards based upon Ethernet technology, and adopts the star topology.

In this particular embodiment, the PSB 100 consists of fourteen node boards 102, a first switch fabric board (SFB) 104 and a second SFB 106. However, the present invention may be expanded to be used with any number of node boards or fabric boards. Similar to the operation of all of the node boards 102, a node board 108 operatively connects to the first SFB 104 to communicate the transfer of packets therethrough. To increase availability, the second SFB 106 is added in operable connectivity to the node board 108 for the communication of packets therethrough. Each node board 102 has two link ports, one of which connects to the first SFB 104 and the other of which connects to the second SFB 106. The dual fabric PSB system 100 is referred to a dual star topology. The link port is a full duplex Ethernet connection, normally with speeds of be approximately 10/100/1000 Mbps. This link port can be any speed as long as the framing is Ethernet.

The following Table 1 defines the general components of the high availability backplane system 100 of FIG. 1.

TABLE 1

| General Components of the High Availability Backplane | |
|---|---|
| Node Board | Consists of a subsystem, which can generate and sink packets. |
| Link port | A physical port that is an endpoint of a link, which connects to a node board and a switch fabric board. |
| Link | A physical connection between a node board and a switch fabric board. |
| Fabric Board | A node that consists of multiple link ports and provides switching functions between node boards. |
| Redirect Link | A link that connects two fabric boards, and is used to reroute the failover traffic. |

Figure 2:
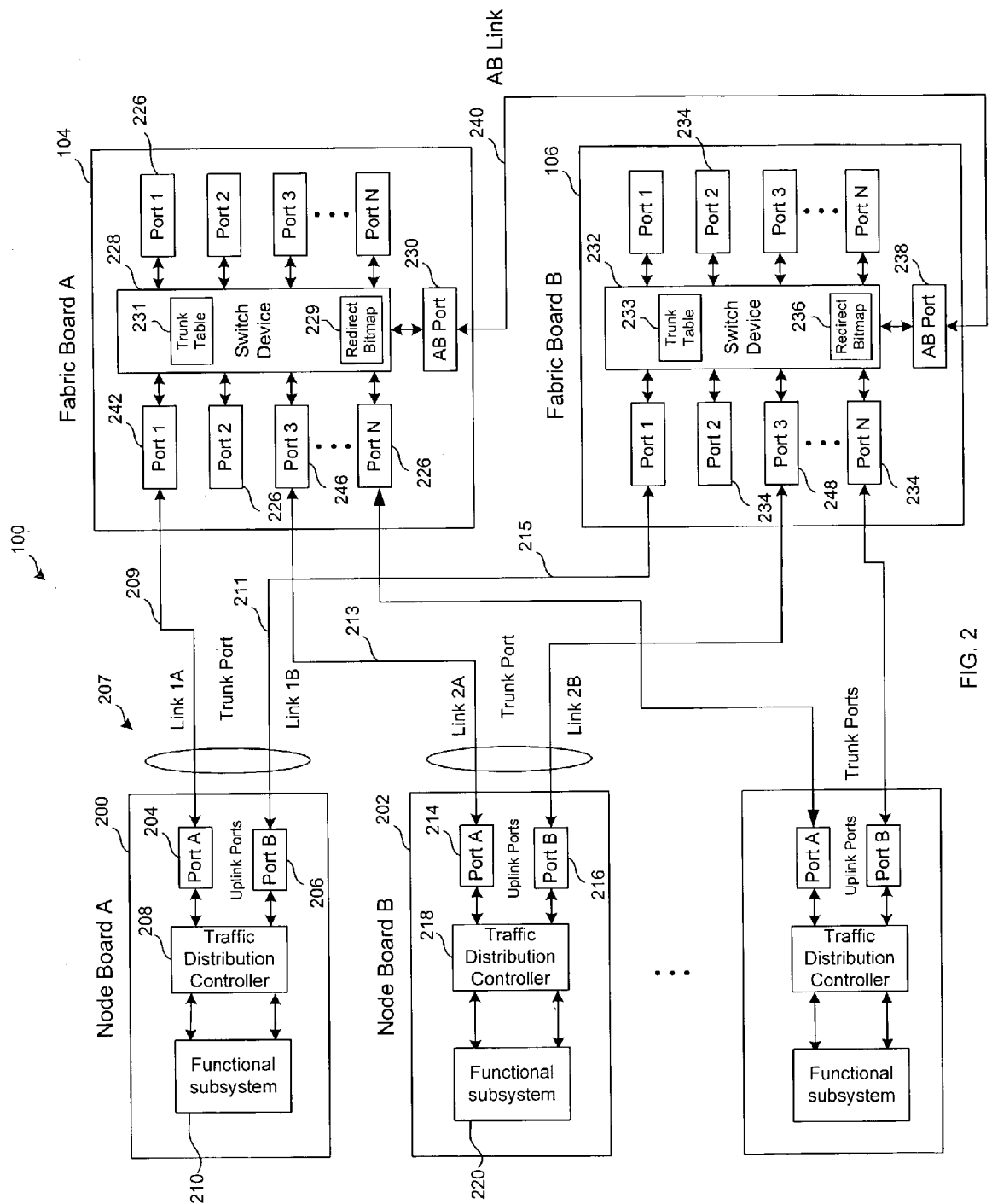
FIG. 2 illustrates a more detailed block diagram of the backplane system, according to a disclosed embodiment.

Referring now to FIG. 2, there is illustrated a more detailed block diagram of the Ethernet backplane system 100, according to as disclosed embodiment. A first node board 200 includes two (or redundant) uplink ports (e.g., Ethernet); a first PHY uplink port 204 and a second PHY uplink port 206 each of which provide respective communication connections between the first SFB 104 and to the second SFB 106. The first SFB 104 and the second SFB 106 are thus are connected in parallel with respective to the first node board 200. the node board 200 includes a function executing subsystem 210, a traffic distribution controller 208 and two uplink port interfaces 204, 206. The traffic distribution controller 208 performs buffering and scheduling and then dispatches the traffic from the function executing subsystem 210 to one of the uplink port interfaces 204, 206 based on the algorithm for port trunking.

The PHY uplink ports (204 and 206) of each node board are grouped as a logical port, called a trunk port 207. When a packet is received into the trunk port 207, the backplane system 100 does not distinguish which physical uplink port (204 or 206) should receive the packet. However, when a packet is transmitted out of the trunk port 207 of the first node board 200, the traffic distribution controller 208 determines to which physical uplink port (204 and 206) the packet will be sent, and forwards the packet to that uplink port. The data utilized for selecting the outgoing uplink port (204 or 206) in the trunking port 207 can be based upon the source and/or destination MAC address, or any other combination of packet information. For example, it can be based upon a hash key from the source and destination MAC address.

The CPU utilizes and maintains a trunking table in the traffic distribution controller 208 for determining which of the uplink ports (204 or 206) to use for outgoing packet traffic. The trunking table stores the current mapping information of the trunk port to the physical uplink ports for outgoing packets. The backplane system 100 controls the distribution of packet traffic between the first SFB 104 and second SFB 106 by accessing the mapping information of the trunk table and determining which trunk port and physical uplink port should be used for the packet traffic. This association in the trunk table changes dynamically according to normal mode operations and failover operations.

The system 100 further comprises a second node board 202 includes two uplink ports (e.g., Ethernet): a first uplink port 214 and a second uplink port 216 which provide a communication connection between the first SFB 104 and to the second SFB 106. The first SFB 104 and to the second SFB 106 are thus are connected in parallel with respective to the second node board 202. The second node board 202 also includes a traffic distribution controller 218 (e.g., an Ethernet switching device, in this embodiment) that selects which of the first and second uplink ports (214 and 216) is downlinked to a function executing subsystem 220 of the second node board 202. The first and second uplink ports 214, 216 are redundant systems.

The first and second SFBs (104 and 106) provide the means of communication between the node boards 102 and 202. The first SFB 104 includes, in this particular embodiment, a fabric switch device 224 and multiple PHY port devices 226 (e.g., Ethernet type). The switch device 224 includes a redirect bitmap (also known as an unreachable bitmap) 229 accessed for redirect information for redirecting packets during failover and a trunk table 231 for storing status information of any of a number of trunk ports. The switch device 224 interfaces with the second SFB 106 via an AB PHY port 230. The second SFB 106 includes, in this particular embodiment, a fabric switch device 232 and multiple PHY port devices 234 (e.g., Ethernet type). The fabric switch device 232 also contains a redirect bitmap 236 accessed for redirect information for redirecting packets during failover, and a trunk table 233 for storing the status information of any of a number of trunk ports. The switch device 232 interfaces with the first SFB 104 via an AB PHY Port 238 over an AB Link 240.

In this embodiment, the backplane system 100 connects the first PHY uplink port 204 of the first node board 200 to a PHY port 242 of the first SFB 104 via a first link 209. The second PHY uplink port 206 connects to a PHY port 244 of the second SFB 106 via a second link 211. The first PHY uplink port 214 of the second node board 202 connects to a PHY port 246 of the first SFB 104 via a third link 213, while the second PHY uplink port 216 connects to a PHY port 248 of the second SFB 106 via a fourth link 215.

In one embodiment, node board signals between the node boards 200 and 202 are communicated between the function executing subsystem 210 of the first node board 200 and the function executing subsystem 220 of the second node board 202 through the first SFB 104 via the respective first uplink ports (204 and 214). Similarly, in response to a detected link failure of the first link 209, failover occurs, and the node board signals are communicated between the function executing subsystem 210 of the first node board 200 and function executing subsystem 220 of the second node board 202 through the second SFB 106 via the respective second uplink ports (206 and 216). Once the link failure of the first link 209 has been resolved, operation resumes in normal mode via the first uplink ports (204 and 214).

Link failure detection can be implemented in different levels. For example, IEEE 802.3 specifies a PHY-level detection mechanism for the Ethernet PHY. In the absence of the data traffic, a transmitting PHY device periodically (e.g., every 16±8 msec) sends a simple heartbeat (HB) pulse, called Normal Link Pulse (NLP). If the receiving PHY device does not detect the arrival of either a data packet or NLP within a predefined window (e.g., 50-150 msec), the receiving PHY device will assume the link has failed.

At the system level, a local CPU on the node board or attached to a switching fabric can be utilized to check link integrity by periodically sending the heartbeat packet to a CPU on the other side of the system. However, this method utilizes more processing power and time by the CPU's for message processing to interrogate the link to detect the link failure has occurred. This method also requires additional bandwidth, even when the link is busy. Link recovery by his method tends to be slower because of the long decision path.

In the present invention, link failure detection is implemented at the MAC level Detection at the MAC level in the backplane system 100 is preferable for the following reasons. In the backplane environment, not all implemented PHY devices may be capable of embedding a link failure detection mechanism like the Ethernet PHY device (e.g., LVDS devices cannot utilize such detection techniques). Therefore, a MAC module needs to provide the link failure detection. Moreover, rapid link failure detection in the PHY implementation requires approximately 50-150 msec of processing time, whereas the MAC module can detect the link failure much faster depending on the speed of the port. For a Gigabit port, detection can occur in less than one millisecond, whereas for a 100 Mbps port, detection occurs in milliseconds. Furthermore link detection at the PHY level cannot detect a link failure due to a malfunction of the MAC module. Note, however, that the disclosed MAC-level detection scheme can accommodate the PHY link failure detection scheme where such a PHY scheme is implemented.

In discussing a failover operation, it is assumed in this particular embodiment that the backplane control logic controls the routing of a packet from the first node board 200 through the first PHY uplink port 204, across the first link 209, into the fabric port 242, switched through the fabric switch 228 for output of the fabric port 246, across the third link 213, into the first uplink port 214 of the second node board 202, and switched by the switch device 218 into the first subsystem 220 of the second node board 202. Thus when the first node board 200 detects the failure of the first link 209, the backplane control logic initiates failover of the packet traffic from the first PHY uplink port 204 to the second uplink port 206 though the second SFB 106. This is accomplished by changing the trunking table, and forcing all the packet traffic of trunk port 207 originally using the now failed first uplink port 204, to use only the second uplink port 206.

Initially, the first link 209 interconnecting the first uplink port 204 of the first node board 200 (of FIG. 2) is assumed to have failed. When the first SFB 104 detects the failure of the first link 209, all packet traffic from the first uplink port 204 is then redirected for forwarding to the redirect link 240. Then, the second SFB 106 receives the packets (or frames) from the redirect port 238 and forwards the packets to the first SFB 104 via the second link 213.

In operation, the node board utilizes port trunking to perform failover. As indicated hereinabove, the uplink ports of a node board are grouped into a logical trunk port. When a packet arrives from the functional subsystem 210, the traffic distribution controller 208 will first search the destination MAC address of the packet in the local MAC address table. The MAC table shows the association of the MAC address and the destination port can be one of the uplink port or logical trunk port. In the case that the MAC is associated to one uplink port, either 204 or 206, the traffic will always be forwarded to that particular port and the failover will not apply to this particular traffic. If the destination is to the uplink trunk, the traffic distribution controller 208 will execute the trunking distribution algorithm to dispatch the packet to one of the uplink ports 204 or 206.

Selection of the physical port can be based upon the hash key, which is generated by hashing the source MAC and/or the destination MAC addresses.

MAC Table at the First Node Board

| MAC Address | Control information | Status | Port/trunk port |
|---|---|---|---|
| MAC_b | ... | | Trunk port 1 |
| ... | | | |

Trunk Port Table for Trunk Port 1 at the First Node Board

| Hash Key | Physical Port |
|---|---|
| 0 | Port 1a |
| 1 | Port 1b |
| 2 | Port 1a |
| 3 | Port 1b |

The CPU of the first node board 200 controls the load distribution of packet traffic among the uplink ports (204 and 206) in the trunk port 207 by appropriately assigning the physical ports "ON" in the trunk table.

When the CPU of the node board 200 is informed of a link failure of, e.g., link 209, of the trunk port 207, the CPU changes the status of all of the first uplink ports (204 and 214, also denoted as Ports 1a in the trunk table) and second uplink ports (206 and 216) for the two redundant node boards (200 and 202) in the trunk table. Therefore, all packet traffic using the trunk port 207 will now be forced to use the second uplink ports (206 and 216, also denoted as Ports 1b in the trunk table). Failover is then achieved.

When the fabric node 104 detects a link failure of any of its ports, the CPU of the fabric board is notified and initiates the failover procedure. The fabric board propagates failure to inform the other fabric board nodes. For example, the CPU of the first SFB 104 signals the second SFB 106 of the node board that connects to the failed link (i.e., now an unreachable node). There exists an redirect bitmap 229 in the first SFB 104 that indicates which port cannot be reached by the other fabric node. When the link failure notice is received, the CPU updates the redirect bit map 229 and sends back an ACK. The redirect bitmap 229 works as a forwarding domain for traffic received from the redirect link so that the node boards with both uplinks working will not receive two copies of a broadcast packet.

Packets received by the redirect link can only be forwarded to the port connected to the node, as indicated in the redirect node bitmap. By providing the redirect bitmap, a node can be prevented from receiving a duplicate broadcast packet. If the redirect bitmap is not provided, a broadcast packet is forwarded to all the ports, including the redirect port. The second SFB 106 will also broadcast the packet. Consequently, all the nodes, except one uplink port of the source node board 204, will receive two copies of packets, one copy form each fabric board. By utilizing the redirect bitmap, the second SFB 106 only forwards packets to the unreachable nodes of the first SFB 104, without sending to other nodes that receive packets from the first SFB 104.

Since the traffic from the node with the failed link will be redirected to the working link, the switch fabric board with the failed link will no longer see the source MAC address associated with the failed port. Thus, the MAC entry on that node board will be aged out eventually. Consequently, the packet with the destination to A will be flooded. therefore, the CPU of the switch fabric board that received the link failure notice shall set the status to 'static' for all MAC entries associated with the failed link port. The table entries with the 'static' status will not be aged out.

After the first SFB 104 receives acknowledgement (ACK) of the Link Failure message from the second SFB 106, the CPU of the first SFB 104 starts to failover to the redirection port packets destined to the failed port by remapping the failed port to redirection port.

On the transmit side, a transmission MAC module periodically sends out a MAC heartbeat message when no packets are currently being transmitted. The duration of the heartbeat message is configurable. In the current implementation, the unit of the period is a time slot, 512-bit transmission time, i.e., 51.2 usec for 10 Mbps and 5.12 usec 100 Mbps. If the link is actively sending regular packet traffic, the link heartbeat message packet will not be transmitted, allowing optimum bandwidth to the link when the link is busy. This is one advantage over the link failure detection done by CPU like spanning tree method.

Note that the PHY devices utilized for the uplink ports and the switching fabric board are not restricted to Ethernet devices, but can be other conventional backplane PHY devices such as LVDS (Low Voltage Differential Signaling). (LVDS is a low-power, low-noise differential technology for high-speed transmission.)

Figure 3:
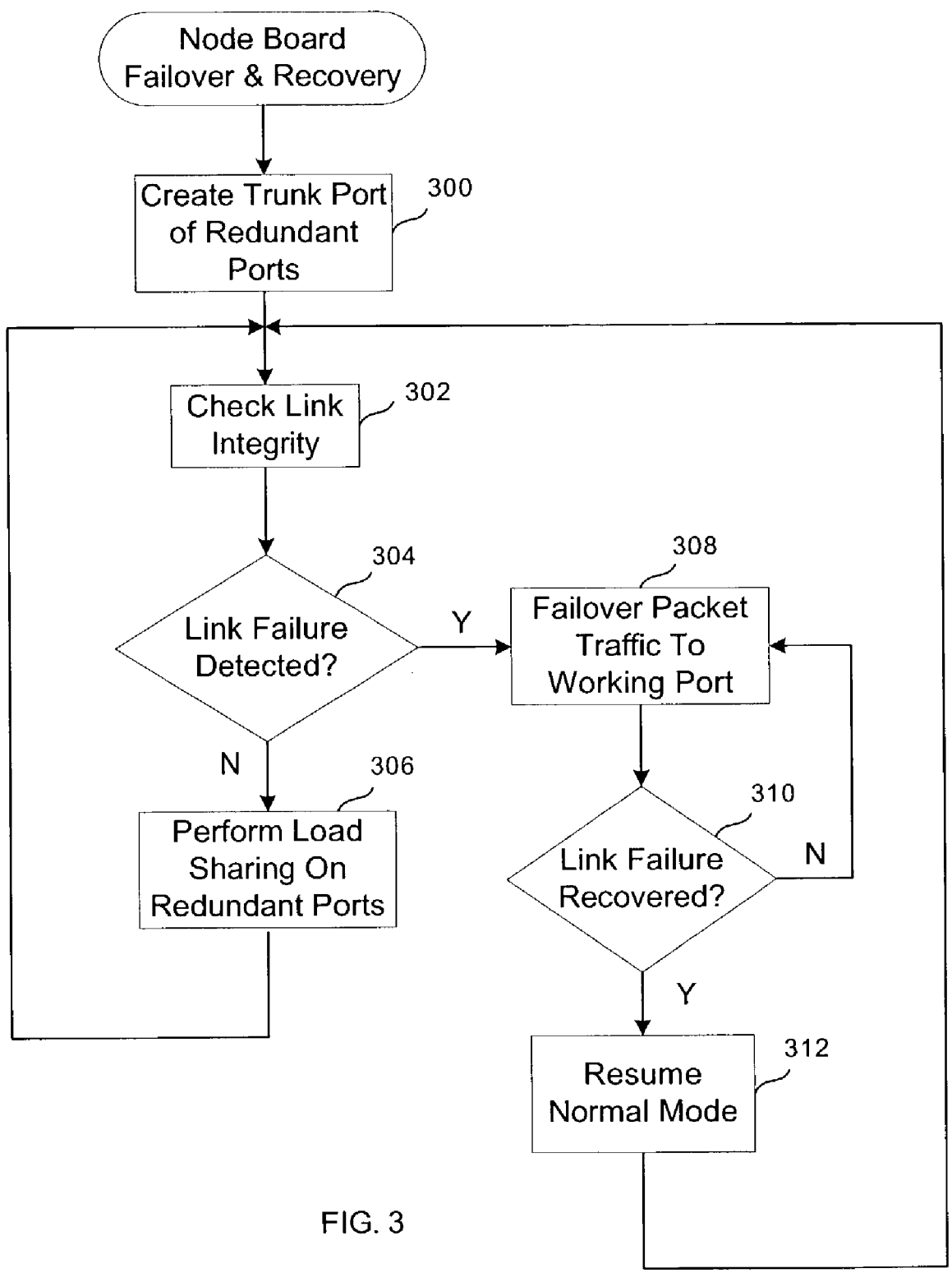
FIG. 3 illustrates a flow chart of the failover process of a node board, according to a disclosed embodiment.

Referring now to FIG. 3, there is illustrated a flowchart of the failover process of a node board, according to a disclosed embodiment. When a device detects a link failure, it immediately enters the failover mode and redirects the traffic on the failed link to a working link. Flow begins at a function block 300 where a trunk port is created of redundant PHY uplink ports. In a function block 302, link integrity check is initiated for all ports. Flow is to a decision block 304 where, if a link failure is not detected, flow is out the "N" path back to the input of function block 302 to perform the next link integrity check. On the other hand, if a link failure is detected, flow is out the "Y" path of decision block 304 to a function block 308 to failover the packet traffic to a working port. Flow is then to a decision block 310 to determine if the failover condition had been resolved. If not, flow is out the "N" path to function block 308 to continue failover of the packet traffic. If so, flow is out the "Y" path of decision block 310 to function block 312 to resume normal mode. Flow is then back to function block 302 to perform the next integrity check.

Figure 4:
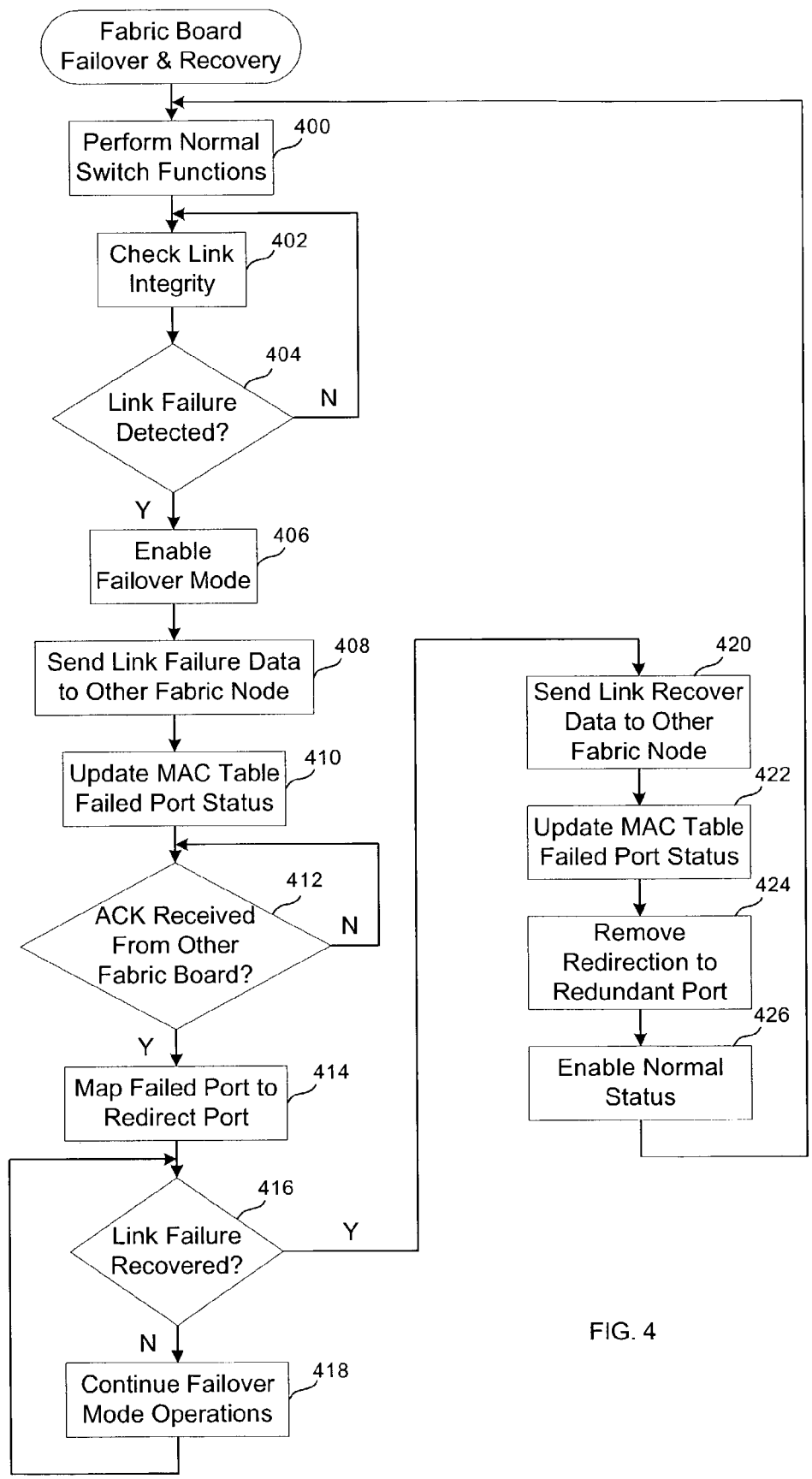
FIG. 4 illustrates a flow chart of the failover process of a fabric board, according to a disclosed embodiment.

Referring now to FIG. 4, there is illustrated a flow chart of the failover process of a fabric board, according to a disclosed embodiment. Flow begins at a function block 400 where the backplane system 100 is performing normal functions in normal mode. In a function block 402, a link integrity check is performed. In a decision block 404, if a link failure is not detected, flow is out the "N" path back to the input of function block 402 to perform the next link integrity check. If a link failure is detected, flow is out the "Y" path of decision block 404 to a function block 406 to enable failover mode. In failover mode, link failure data is transmitted to other fabric boards, as indicated in a function block 408. A MAC table is then updated with the failed port status information, as indicated in a function block 410. Flow is then to a decision block 412 to determine if an acknowledgement (ACK) signal has been received from the other fabric boards. If not, flow is out the "N" path to continue checking for receipt of the ACK signal. If the ACK signal has been received, flow is out the "Y" path of decision block 412 to a function block 414 to map the failed port to a redirect port, based upon redirect information contained in the redirect bitmap. Packet traffic is then redirected accordingly until failover is resolved. In a decision block 416, a check is made to determine if failover has been resolved. If not, flow is out the "N" path to a function block 418 to continue operating in failover mode. Flow then loops back to the input of decision block 416 to perform the next failover recovery check. If link recovery has occurred, flow is out the "Y" path of decision block 416 to a function block 420 where link recovery data is forwarded to the other fabric board. The MAC table is then updated accordingly to reflect the link recovery, as indicated in a function block 422. The redirect bitmap is then updated to remove the redirection information to the redundant port, as indicated in a function block 424. The backplane system 100 then resumes normal operating mode, as indicated in a function block 426. Flow then loops back to function block 400 to begin performing normal operation switch functions.

Figure 5:
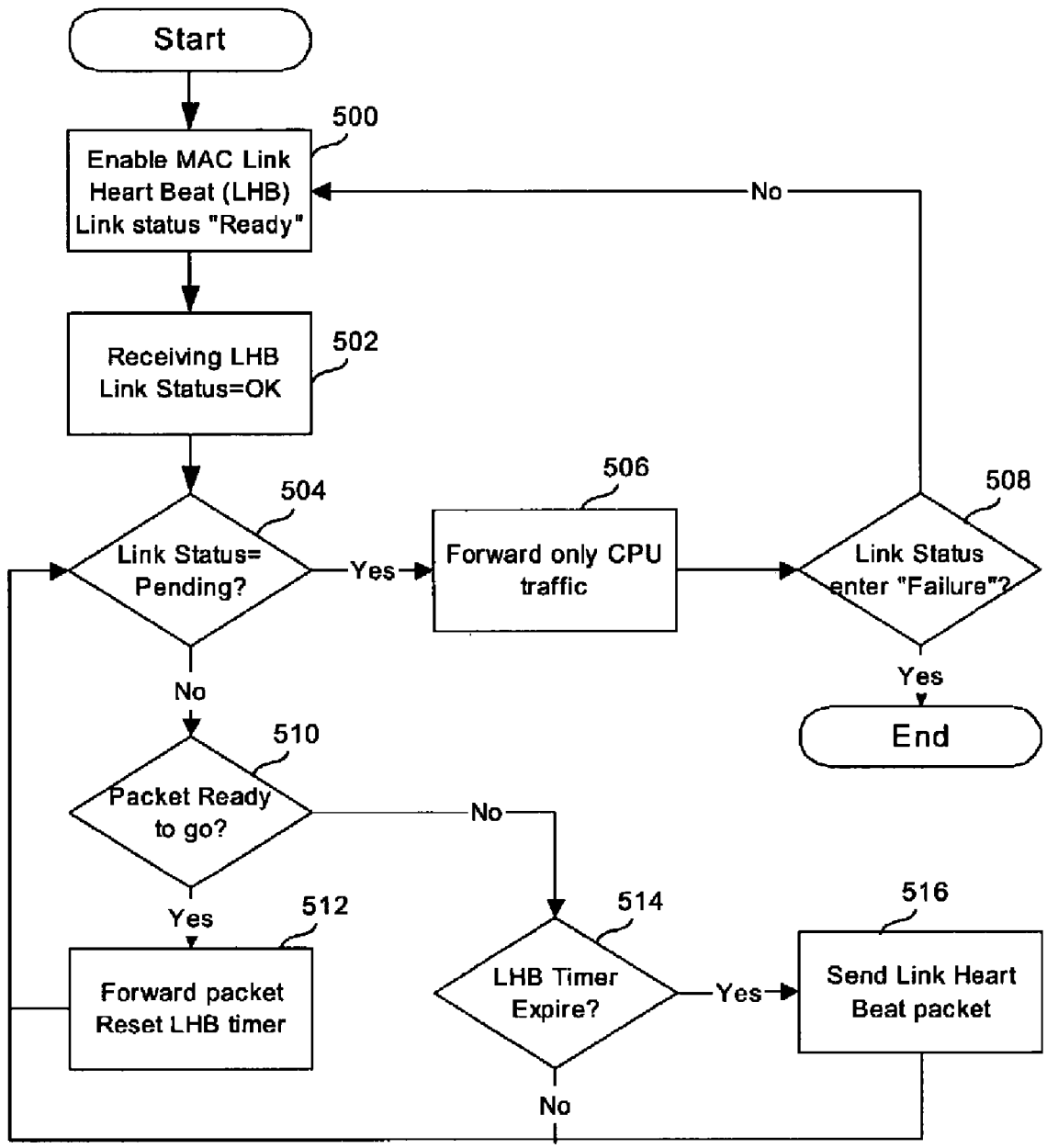
FIG. 5 illustrates a state diagram of the heartbeat signal from the sending side.

Referring now to FIG. 5, there is illustrated a state diagram of the heartbeat signal from the sending side. Flow begins at a function block 500 where the MAC link heartbeat (LHB) signaling is enabled, and the status is designated as "Ready". If a LHB signal has been received, then the status is designated as "OK", as indicated in a function block 502. In a decision block 504, it is determined if the link status is "Pending". If so, flow is out the "Y" path to a function block 506 to forward only CPU packet traffic. In a decision block 508, a check for link failure is made. If no link failure is determined, flow is out the "Y" path to the function block 500 to continue enabling the MAC LHB signal. On the other hand, if a link failure has been detected, flow is out the "N" path of decision block 508 to an End Terminal.

If a link status check is not pending, flow is out the "N" path of decision block 504 to a decision block 510 to determine if a packet is ready for transmission. If so, flow is out the "Y" path to a function block 512 to forward the packet, and reset the LHB timer. Flow then loops back from function block 512 to decision block 504 to determine again if the system is in a pending state for a link status update. If a packet is not ready for transmission, flow is out the "N" path of decision block 510 to a decision block 514 to determine if the LHB timer has expired. If not, flow is out the "N" path back to the function block 504 to check on the link status. If the LHB timer has expired, flow is out the "Y" path of decision block 514 to a function block 51 to send one or more LHB packets. Flow is then back to the function block 504 to again check on the link status.

Following is a format of the 64-byte link heartbeat (HB) message (values in Hex).

| Dest_MAC_address(6) | SRC_MAC_address(6) | Ethertype(2) | Opcode(2) | Pad(44) | CRC(4) |
|---|---|---|---|---|---|
| 01-80-C2-00-00-01 | Port MAC Address | 88-08 | 00-02 | Pad 44 "00" | CRC-32 |

As indicated, the Destination MAC Address field is a 6-byte value, and is 01-80-C2-00-00-01. The address of the Flow Control Message for IEEE Std. 802.3x Full Duplex PAUSE operation is shared. The port MAC address field is used as the Source MAC address, which is six bytes. The Ethertype field is two bytes, and is 88-08, which indicates the MAC control format. The 2-byte Opcode value is a value that can be programmable (e.g., a value of 00-02), except the value "00-01", which has been defined as the flow control frame in IEEE 802.3X. Both the transmitting and the receiving ends must use the same Opcode value. The 44-byte Pad field adds forty-four bytes of zeros "00" to meet the 64-byte minimum length of the Ethernet frame. The format of the link heartbeat message is also shown in FIG. 7.

The HB Control Message Format.

| 0 | 1 | 2 | 3 | 4 | 5 | 6 | 7 |
|---|---|---|---|---|---|---|---|
| 01 | 80 | C2 | 00 | 00 | 01 | 00 | 00 |
| 00 | 00 | 00 | 00 | 88 | 08 | 00 | 02 |
| 00 | 00 | 00 | 00 | 00 | 00 | 00 | 00 |
| ... | | | | | | CRC32 | |

Figure 6:
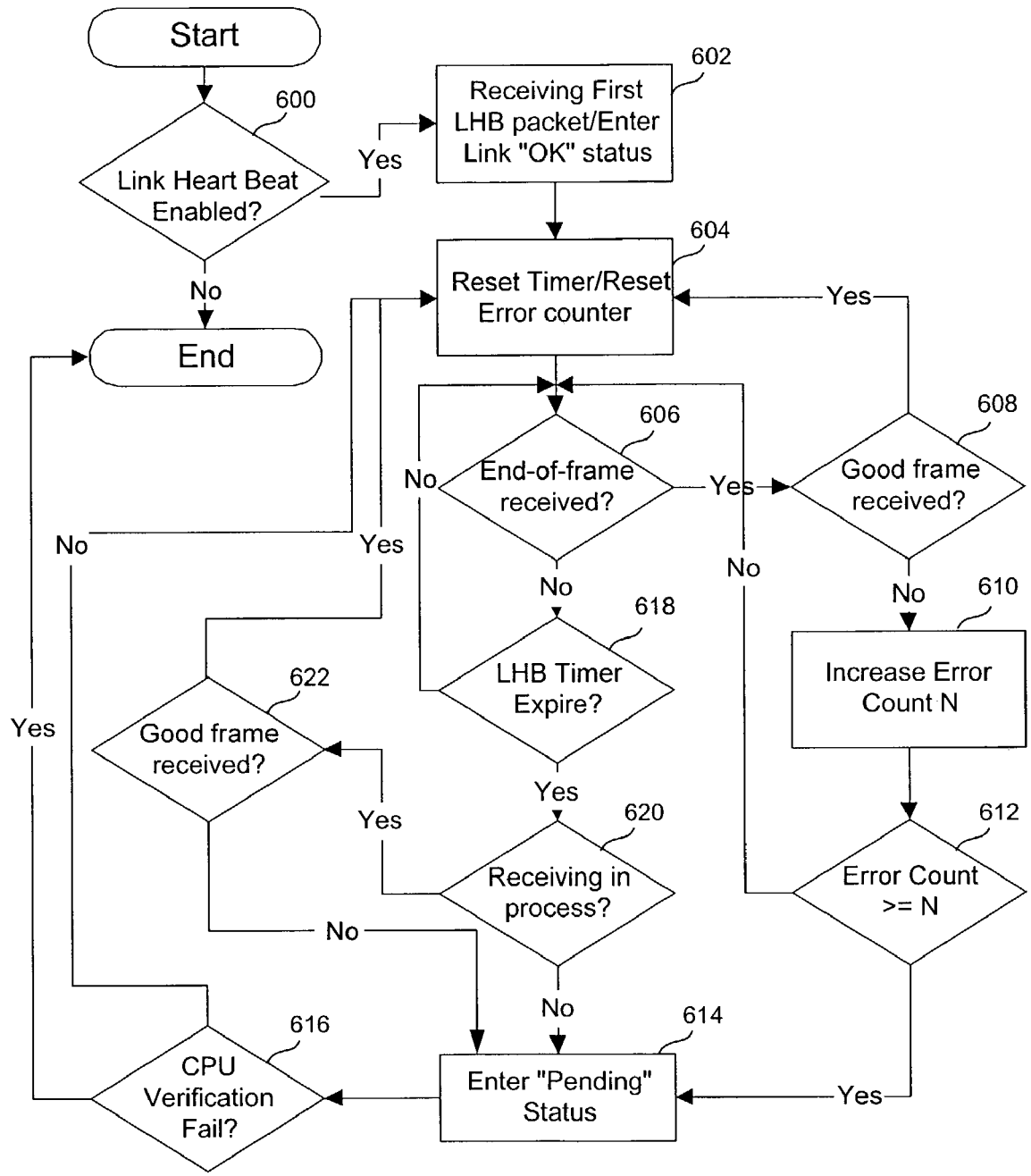
FIG. 6 illustrates a state diagram of the heartbeat signal from the receiving side.

Referring now to FIG. 6, there is illustrated a state diagram of the heartbeat signal from the receiving side. To initiate a MAC module, power is applied, at which time all ports are reset and the status changes to LINK READY. The CPU enables the Heartbeat feature, and the MAC starts sending the MAC LHB signal. The MAC waits for the receiver to send its first LHB signal showing the equivalent capability from remote device, and then changes the status to LINK OK. Switched traffic is then forwarded. On the receiving side, a MAC link detection module monitors the arriving packets. If a good packet arrives within a predefined window time from the last receiving frame (which time window is denoted LINK_FAIL), then the link is in the working mode. The value of the $LINK_{13}FAIL$ time window is configurable, and usually set to approximately twice the transmission period of the LHB message. A good packet indicates that a good data frame or control frame including a MAC heartbeat message has been communicated. Note that the MAC LHB signal is absorbed at the MAC module and cannot be forwarded to the CPU or other ports. Once the MAC does not detect a frame within the LINK_FAIL window, it will enter the LINK PENDING status and send a HEARTBEAT LOST message to the CPU. When the MAC receives N consecutive bad frames, it also enters the LINK PENDING status. In the LINK PENDING status, the MAC module stops transmitting switched traffic. However, the CPU packet and the LHB packet will be continuously transmitted in this state. The CPU may verify the final link status by trying to communicate with the remote device. If the connection cannot be resumed, this port enters LINK Failure status.

Flow begins at a decision block 600 to determine of the LHB has been enabled. If not, flow is out the "N" path to an End terminal. Otherwise, flow is out the "Y" path to a function block 602 to receive the first LHB packet. The link status is then set to "OK". Flow is to a function block 604 to reset both the timer and error counter. In a decision block 606, the system determines if an end-of-frame has been received. If so, flow is out the "Y" path to a decision block 608 to determine if the received frame was a good frame. If so, flow is out the "Y" path to the function block 604 to reset both the timer and counter in preparation for the next packet (or frame). If the received frame was not good, flow is out the "N" path of decision block 608 to a function block 610 to increase the error count. Flow is then to a decision block 612 to determine the magnitude check on the error count. If the error count is not greater than or equal to a predetermined value N, flow is out the "N" path to the input of decision block 606 to determine if the next end-of-frame has been received. If the error count of the error counter is greater than or equal to a predetermined value N, flow is out the "Y" path to a function block 614 to change the status to "Pending". Flow is then to a decision block 616 to determine if CPU verification has failed. If so, flow is out the "Y" to the End terminal. If CPU verification has not failed, flow is out the "N" path to the function block 604 to reset both the timer and error counter.

If an end-of-frame has not been received, flow is out the "N" path of decision block 606 to a decision block 618 to determine of the LHB timer has expired. If not, flow is out the "N" path to the input of decision block 606. If the LHB timer has expired, flow is out the "Y" path of decision block 618 to a decision block 620 to determine if packet receiving is in process. If not, flow is to the function block 614 to change the status to "Pending" and to the decision block 616 to determine if the CPU verification has failed. If packet receiving is in process, flow is out the "Y" path of decision block 620 to a decision block 622 to determine if a good frame (or packet) was received. If so, flow is out the "Y" path to the function block 604 to reset both the LHB timer and the error counter. If a good packet was not received, flow is to the function block 614 to change the status to "Pending" and to the decision block 616 to determine if the CPU verification has failed.

Although the preferred embodiment has been described in detail, it should be understood that various changes, substitutions, and alterations can be made therein without departing from the spirit and scope of the invention as defined by the appended claims.

What is claimed is:

1. A method for determining failure of a communications link, the steps comprising:
   setting, by a computing device, a timer for a predetermined interval;
   waiting the predetermined interval for a link heartbeat packet;
   determining whether an end-of-frame packet is received;

in response to determining that the end-of-frame indication has been received, determining whether a good frame is received;

in response to determining that an end-of-frame packet has not been received, determining whether the timer has expired;

in response to determining that the timer has expired, determining whether receiving is in progress;

entering a pending status if the receiving is not in progress;

determining whether a central processing unit (CPU) verification has failed;

in response to determining that the CPU verification has not failed, resetting the timer;

increasing an error count;

determining whether the error count exceeds a predetermined value;

in response to determining that the error count exceeds the predetermined value, entering the pending status;

in response to determining that the error count does not exceed a predetermined value, determining whether the end-of-frame indication is not received; and sending, by the computing device, link failover data to a switch fabric board.

2. The method of claim 1, the steps further comprising changing the status of the communication link to failure mode after a predetermined number of consecutive invalid packets are received.

3. A method for a switch fabric board having a redirect table to handle a link failure, the steps comprising:

performing a link integrity check for each link coupled to the switch fabric board, wherein performing an integrity check includes:

increasing an error count;

determining whether the error count exceeds a predetermined value;

in response to determining that the error count exceeds the predetermined value, entering a pending status;

in response to determining that the error count does not exceed a predetermined value, determining whether an end-of-frame indication is not received; and enabling a link failover mode upon failure of a link integrity check, the steps of the link failover mode comprising:

sending link failure data to at least one other switch fabric board, updating a media access control table with link failure data, and mapping a failed port to a redirect port;

determining whether the link failure is recovered;

sending link recover data to the working port; and removing mapping of traffic to the working port.

4. The method of claim 3, the performing step comprising:

setting a timer for a predetermined interval;

waiting the predetermined interval for a link heartbeat packet;

resetting the timer to the predetermined interval whenever a valid packet is received; and changing the status of the communication link to a failure mode when the timer expires.

5. The method of claim 4, the performing step further comprising changing the status of the communication link to failure mode after a predetermined number of consecutive invalid packets are received.

6. A method for sending a link heartbeat message, the steps comprising:

setting, by a computing device, a timer;

sending a link heartbeat packet when the timer expires;

determining whether an end-of-frame packet is received;

in response to determining that the end-of-frame indication has been received, determining whether a good frame is received;

in response to determining that an end-of-frame packet has not been received, determining whether the timer has expired;

in response to determining that the timer has expired, determining whether receiving is in progress;

entering a pending status if the receiving is not in progress;

determining whether a central processing unit (CPU) verification has failed;

in response to determining that the CPU verification has not failed, resetting the timer; and increasing an error count;

determining whether the error count exceeds a predetermined value;

in response to determining that the error count exceeds the predetermined value, entering the pending status;

in response to determining that the error count does not exceed a predetermined value, determining whether an end-of-frame indication is not received; and sending, by the computing device, link failover data to a switch fabric board.

7. A telecommunications node that includes a non-transitory computer-readable medium that stores a program that, when executed by a computer, causes the computer to perform at least the following:

determine whether an end-of-frame packet is received;

in response to determining that an end-of-frame packet has not been received, determine whether the timer has expired;

in response to determining that the timer has expired, determine whether receiving is in progress;

enter a pending status if the receiving is not in progress;

determine whether a central processing unit (CPU) verification has failed;

in response to determining that the CPU verification has not failed, reset the timer;

increase an error count;

determine whether the error count exceeds a predetermined value;

in response to determining that the error count exceeds the predetermined value, enter a pending status; and in response to determining that the error count does not exceed a predetermined value, determine whether an end-of-frame indication is not received; and transmit heartbeat messages to a receiving node, the heartbeat messages comprising:

a destination media access control address;

a source media access control address;

an ethertype field indicating a media access control format; and an opcode, wherein the ethertype value in hexadecimal is 88-08.

8. The telecommunications node of claim 7 wherein the opcode is an equivalent predetermined two byte value for the transmission module and for the receiving node.

9. The telecommunications node of claim 8 wherein the transmission module inserts padding bytes into the heartbeat messages sufficient to make each heartbeat message a packet 64 bytes in length.

10. The telecommunications node of claim 7, wherein the program is further configured to cause the computer to perform at least the following:
- in response to determining that the end-of-frame indication has been received, determine whether a good frame is received;
- increase an error count;
- determine whether the error count exceeds a predetermined value;
- in response to determining that the error count exceeds the predetermined value, enter the pending status; and
- in response to determining that the error count does not exceed a predetermined value, determine whether an end-of-frame indication is received.

11. The method of claim 1, wherein, in response to determining that the CPU verification has failed, the method ends.

* * * * *